US008895681B2

(12) United States Patent
Howell et al.

(10) Patent No.: US 8,895,681 B2
(45) Date of Patent: Nov. 25, 2014

(54) PROCESSES FOR PREPARING LOW MOLECULAR WEIGHT HEXAFLUOROPROPYLENE-OLEFIN COTELOMERS

(75) Inventors: Jon Lee Howell, Bear, DE (US); Clay Woodward Jones, Washington, WV (US); Robert Clayton Wheland, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 1383 days.

(21) Appl. No.: 11/614,554

(22) Filed: Dec. 21, 2006

(65) Prior Publication Data

US 2008/0154000 A1   Jun. 26, 2008

(51) Int. Cl.
*C08F 214/28* (2006.01)

(52) U.S. Cl.
CPC .................................. *C08F 214/28* (2013.01)
USPC ........... 526/247; 526/204; 526/209; 526/225; 526/236; 526/249; 526/250; 526/254; 526/255; 570/125

(58) Field of Classification Search
USPC ........................... 526/247, 250, 254; 570/125
See application file for complete search history.

(56) References Cited

U.S. PATENT DOCUMENTS

| | | | |
|---|---|---|---|
| 2,446,214 A | 8/1948 | Cramer | |
| 3,069,401 A | 12/1962 | Gallagher | |
| 3,935,374 A * | 1/1976 | Yoshikawa et al. | 174/102 R |
| 5,310,870 A | 5/1994 | Peavy | |
| 5,350,878 A | 9/1994 | Caporiccio | |
| 5,446,214 A | 8/1995 | Caporiccio et al. | |
| 5,478,905 A | 12/1995 | Anolick et al. | |
| 5,493,049 A | 2/1996 | Caporiccio et al. | |
| 5,637,663 A | 6/1997 | Anolick et al. | |
| 5,663,255 A * | 9/1997 | Anolick et al. | 526/254 |
| 5,674,957 A * | 10/1997 | DeSimone et al. | 526/89 |
| 6,133,389 A | 10/2000 | Anolick et al. | |
| 6,486,280 B1 | 11/2002 | Anolick et al. | |
| 6,583,065 B1 * | 6/2003 | Williams et al. | 438/714 |
| 6,716,942 B1 * | 4/2004 | Saito et al. | 526/242 |
| 6,767,626 B2 * | 7/2004 | Tuminello et al. | 428/336 |
| 2002/0147289 A1 * | 10/2002 | Amin-Sanayei et al. | 526/255 |
| 2003/0211332 A1 | 11/2003 | Tuminello et al. | |

FOREIGN PATENT DOCUMENTS

WO          88/08007 A1     9/2008

OTHER PUBLICATIONS

Drobny, Technology of Fluoropolymers, 2001, CRC Press LLC, p. 15.*
Flick, E. W. "Monohydric Alcohols", Industrial Solvents Handbook, 1998, William Andrew Publishing, Noyes, 5th edition, p. 238.*
European Search Report Dated Apr. 21, 2008 for European Patent Application No. 07255026.

* cited by examiner

*Primary Examiner* — Nicole M Buie-Hatcher

(57) ABSTRACT

Amorphous hydrofluoroolefin telomers are prepared by a free-radical polymerization process conducted at high temperature and pressure in the presence of non-monomeric chain transfer agent.

10 Claims, 1 Drawing Sheet

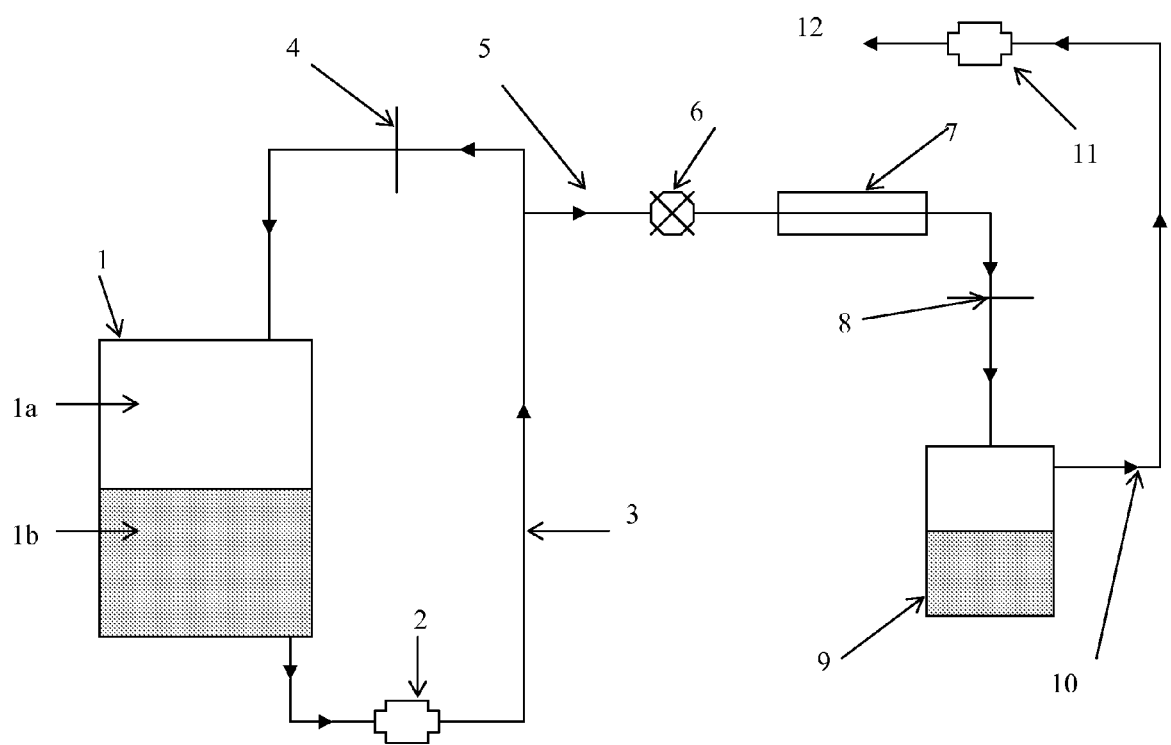

US 8,895,681 B2

PROCESSES FOR PREPARING LOW MOLECULAR WEIGHT HEXAFLUOROPROPYLENE-OLEFIN COTELOMERS

FIELD OF THE INVENTION

The present invention is directed to the preparation of hydrofluoroolefin telomers by a free-radical polymerization process conducted at high temperature and pressure in the presence of non-monomeric chain transfer agent

BACKGROUND OF THE INVENTION

Fluorinated oils and greases are employed as lubricants in demanding applications. A well-known class of fluorinated lubricants are the perfluoroalkylpolyether oils available as commercial products under the trade names KRYTOX® (E. I. du Pont de Nemours and Company, Wilmington Del.), FOMBLIN® (Ausimont, Milan, Italy), and DEMNUM® (Daiken Industries, Japan). It is found in practice that in oxygen containing environments, the perfluoroalkylpolyethers may undergo degradation at temperatures as low as 150° C., with concomitant corrosion of some metal surfaces such as aluminum, iron and alloys thereof. There is a need for lubricating oil that remains stable to oxidative degradation at elevated temperature, and prevents corrosion of a lubricated metal surface.

U.S. Pat. No. 3,069,401 discloses the reaction hexafluoropropene with vinylidene fluoride and an aliphatic compound selected from the group consisting of alcohols, ketones and carboxylic acid esters that served as chain transfer agent in the presence of an initiator such as di-t-butylperoxide, and optionally a solvent.

U.S. Pat. Nos. 5,350,878, 5,446,214, and 5,493,049 disclose low molecular weight cotelomers of hexafluoropropene with more reactive telomers, prepared at relatively low temperatures and pressures using chlorinated and brominated terminal telogens to limit the molecular weight of the product copolymers and to obtain liquid products with chlorinated and brominated terminal groups that limit the thermal stability of the products.

U.S. Pat. No. 2,446,214 discloses that few units of hexafluoropropene (HFP) are incorporated using perfluoroalkyl iodides as a terminal telogen. U.S. Pat. No. 2,446,214 discloses the use of gamma radiation for initiation. Such high-energy initiation can causes extensive branching and cross-linking, composition characteristics that are undesirable in oils.

Anolick et al., U.S. Pat. Nos. 5,478,905, 5,663,255, 5,637,663, and 6,133,389 disclose a continuous polymerization process comprising contacting a large excess of hexafluoropropylene with fluoro-olefins such as tetrafluoroethylene and vinylidene fluoride and a radical initiator under a pressure of about 41 to about 690 MPa, and a temperature above about 200° to about 400° C. to produce amorphous copolymers.

Oligomeric high HFP content copolymers have numerous potential uses for protection of surfaces and lubrication, but the use of monomeric chain transfer agent undesirably couples molecular weight control with composition. U.S. Pat. No. 6,767,626 discloses an adaptation of the process disclosed by Anolick et al. to prepare oligomeric liquids using certain monomers for molecular weight control. It is desirable to find a chain transfer agent that affords desirable productivity for producing oligomeric oils but that is preferably not incorporated into the polymer chain except as chain terminators.

SUMMARY OF THE INVENTION

One aspect of the present invention is a process comprising:
1) forming a reaction mixture by combining reactants comprising from 80 to 99 weight percent of HFP, from 1 to 20 weight percent of an olefinically unsaturated co-monomer, from 0.05 to 2 weight percent of a free-radical initiator, and from 0.25 to 5 wt-% of a non-monomeric chain transfer agent, based on the total weight of the reaction mixture;
2) causing the free-radical initiator to initiate a free-radical polymerization; and
3) causing the reaction mixture to undergo free radical polymerization at a temperature in the range of 225 to 400° C. and a pressure of 40-700 MPa, for a period of 1 second to 30 minutes, to form an amorphous HFP liquid telomer comprising from 30 mole % to 95 mole % of monomer units derived from HFP.

BRIEF DESCRIPTION OF THE FIGURE

FIG. 1 shows an apparatus used to prepare the telomeric fluoroolefins according to one embodiment of the present invention.

DETAILED DESCRIPTION

For the purposes of the present disclosure, the term "telomer" refers to one or more members of a homologous series of liquid perfluorocarbons or liquid hydrofluorocarbons synthesized by the polymerization process disclosed hereinbelow, wherein the use of chain transfer agents serves to limit the molecular weight of the polymer formed.

The present invention provides processes for making telomeric liquids based upon copolymers with HFP, the HFP being present in an amount to minimize, and desirably prevent, crystallization, preferably 30 to 95 mol-% in the polymer. The telomeric liquids are suitable for use as coatings and lubricants. The telomeric liquids produced represent a distillable homologous series of fractions, having varied voscisities. The telomers produced by this process range from hydrofluorocarbons to perfluorocarbons with hydrogen containing end groups.

The present processes include the use of non-monomeric chain transfer agents, resulting in high productivity reactions wherein molecular weight control and telomer composition are separated, unlike in known processes wherein molecular weight and composition are coupled, providing an additional degree of freedom over known processes.

In one embodiment, the present invention provides a process comprising forming a reaction mixture by combining 80 to 99 weight percent of HFP, preferably 90-97 weight percent; 1 to 20 weight percent, preferably 3-10 weight percent, of an olefinically unsaturated co-monomer; 0.05 to 2 weight percent, preferably 0.05-0.8 weight percent, of a free-radical initiator, and 0.25 to 5 weight percent, preferably 0.5-1 weight percent, of a non-monomeric chain transfer agent based on the total weight of the reaction mixture; causing the free-radical initiator to initiate a free-radical polymerization; and causing the reaction mixture to undergo free radical polymerization at a temperature in the range of 225 to 400° C., a pressure of 40-700 MPa (5.8 to 100 kpsi), for a period of 1 second to 60 minutes, to form an amorphous HFP liquid telomer comprising 30-95% of monomer units derived from HFP.

The processes of the present invention provide a mixture of telomers that can be broken into two components, fluorohydrocarbon lubricating oil and fluorohydrocarbon volatile fluids. The fluorohydrocarbon volatile fluids are useful as solvents for polymers and as degreasers.

As used herein the term "volatile fluid" refers to that part of a product mixture that can be distilled between about 40 and 200° C. at pressures ranging from atmospheric to 0.1 torr (13 Pa). The term "lubricating oil" refers to that part of a product that is left behind after distillation. The oil boils above about 100 to 200° C. when under a vacuum of about 0.1 to 3 torr (13 to 400 Pa).

The lubricating oil produced is an amorphous perfluorohydrocarbon or a partially fluorinated hydrocarbon, comprising 30 to 95%, preferably 40 to 60%, of monomer units of HFP, and a C—H/C—F bond ratio of from 0 to 1. The viscosity of the oil ranges from 1 to 10,000 cSt at 40° C.

The apparatus for running the telomerization can be any suitable pressure apparatus in which the reactant and product streams may be added and removed at appropriate rates. Thus the apparatus can be a stirred or unstirred autoclave, a pipeline type reactor, or other suitable apparatus. Agitation is not necessary, but is preferable for reducing polydispersity. The material of construction should be suitable for the process ingredients, and metals such as stainless steel or Hastalloy are often suitable.

The resulting product contains from 30 to 95 mole % of monomer units derived from HFP, preferably 40-60%. The reaction product can be separated into fractions differing in molecular weight and monomer composition by distillation, thereby separating the volatile fluid from the oil. Distillation is beneficially accomplished in the pressure range of 0.1 to about 1.0 torr pressure. Temperatures are desirably about 100° C., or higher, and temperatures of about 150° C. or more may be preferred, even about 200° C. As a general guideline, it will be appreciated by one skilled in the art that different fractions can be distilled at different temperatures and pressures. The residue remaining after distillation is the oil. The reaction product comprises a homologous series of telomers that can be fractionally distilled into several components, or the distillate fractions can be combined depending upon the needs for a specific end use. The residual oil following distillation has a viscosity of 1 to 10,000 cSt at 40° C., and is useful as a lubricant.

Some Mn values for the HFP oils disclosed herein were determined by gel chromatography and are about 2000.

Suitable comonomers for cotelomerization with HFP are characterized by olefinic unsaturation and are polymerizable in a free-radical polymerization reaction. Suitable comonomers include but are not limited to vinylidene fluoride; perfluoroalkylvinyl ethers of the structure $R_fOCF=CF_2$ wherein $R_f$ is a C1-C4 perfluoroalkyl radical such as perfluoropropylvinyl ether, perfluoromethylvinyl ether or perfluoroisopropylvinyl ether; ethylene; hexafluoroisobutylene; perfluoroalkylethylenes of the structure $R_fCH=CH_2$ wherein $R_f$ is a linear C1 to C8 perfluoroalkyl radical such as perfluorobutylethylene (PFBE) or 3,3,3-trifluoropropene (TFP); vinyl fluoride (VF); trifluoroethylene; tetrafluoroethylene and: chlorotrifluoroethylene, and combinations thereof. Vinylidene fluoride; perfluoropropylvinyl ether; ethylene; and tetrafluoroethylene are preferred, wherein the total of the concentrations of vinylidene fluoride, ethylene, and tetrafluoroethylene is 10 weight-% or less.

Suitable free radical initiators include but are not limited to nitrogen trifluoride, di-t-butylperoxide, oxygen, perfluoropiperazine; $R_fNF_2$, $(R_f)_2NF$, $R_fN=NR_f$, $R_fOOR_f$, $R_fSO_2R_f$, and $R_fSO_2F$ wherein each $R_f$ is independently a $C_nF_{(2n+1)}$ group, with n=1 to 4, linear or branched, and hindered fluorocarbons of the formula CnF(2n+2), such as are described by Tonelli et al. in WO 88/08007. Hindered fluorocarbons, such as $(CF_3)_2CFC(C_2F_5)_2CF_3$ readily undergo homolytic scission releasing radicals that are free radical initiators. Nitrogen trifluoride and di-t-butylperoxide are preferred.

A "chain transfer agent" is defined herein as an additive or a monomer that first terminates the growth of one polymer chain and then reinitiates the growth of a new polymer chain. This interruption of chain growth lowers molecular weight. Preferably this transfer of the actively growing radical from one chain to a new chain is achieved with a minimal loss in yield and rate of production.

Chain transfer agents suitable for use in the processes disclosed herein are non-monomeric radical formers. Chain transfer agents that cannot be copolymerized can effectively decouple the composition of the telomer produced in the process from the molecular weight. Suitable chain transfer agents include but are not limited to linear, branched, or cyclic $C_1$-$C_6$ hydrocarbons such as ethane; dialkyl ethers, such as dimethyl ether or diethyl ether; tetrahydrofuran, $FSO_2Cl$, $ClSO_2Cl$, aromatics such as p-xylene and hexafluorobenzene, and siloxanes such as octamethyltrissiloxane. Mixtures of chain transfer agents can also be employed. Other suitable chain transfer agents include perfluoroalkyl iodides such as CF3I or C4F9I, chlorocarbons such as CHCl3 and HCCl3, fluorochlorocarbons such as FCCl3, fluorobromocarbons such as CFBr3, thiols such as CF3SH, sulfonyl chlorides such as FSO2Cl, phosphine PH3, phosphorous pentachloride, silanes such as Cl2SiH(CH3), HBr, IF5, ICl, IBr, I2, Cl2, Br2, CH3OH, (EtO)2P(O)H, cyclopentane, THF, H2S, HI, POCl3, SF5Br, isopropanol, methylcyclohexane, diethylether, dioxane, triethylamine, C6H5CH2Br,CH3(C=O)(C=O)C(CH3)2H, methyl acetate.

There is no limitation to the number of comonomers that can be employed, except as dictated by practicality, provided that the product contains 30-95% of monomer units derived from HFP.

In one preferred embodiment of the present invention, HFP is copolymerized with $VF_2$. In a further embodiment HFP is copolymerized predominantly with $VF_2$ and one or more additional monomers. By the term "copolymerized predominantly" is meant that the relative amounts of the monomers employed in the reaction mixture is such that a higher percentage of monomer units are present in the resulting telomer derived from the "predominant" comonomer than from any of the other comonomers. Preferred additional monomers and combinations of monomers in addition to HFP+VF2 include ethylene; TFE; a combination of HFIB and ethylene; HFIB; a combination of PFBE and ethylene; a combination of PMVE and ethylene; a combination of PPVE and ethylene; and PPVE, wherein the total of the concentrations of vinylidene fluoride, ethylene, and tetrafluoroethylene is 10 weight % or less.

Thus, for example, contemplated in one embodiment is a process combining HFP, $VF_2$, and TFE in amounts such that the percentage of monomer units of TFE in the telomer formed is much lower than that of HFP and $VF_2$.

In another preferred embodiment HFP and TFE are copolymerized. In a further embodiment HFP is copolymerized predominantly with TFE and one or more additional monomers. Preferred additional monomers include PPVE, $VF_2$, hydrocarbon olefins such as ethylene; hydrofluorocarbon olefins such as HFIB, PFBE, 3,3,3-trifluoropropene; fluoroalkylether olefins such as PMVE and PPVE, and chlorotrifluoroethylene, wherein the total of the concentrations of vinylidene fluoride, ethylene, and tetrafluoroethylene is 10 weight % or less.

In another preferred embodiment HFP and ethylene are copolymerized. In a further embodiment, HFP is copolymerized predominantly with ethylene and one or more additional monomers such as those recited supra, wherein the total of the concentrations of vinylidene fluoride, ethylene, and tetrafluoroethylene is 10 weight % or less.

There are significant reactivity differences among the numerous olefinically unsaturated monomers suitable for use in the present processes. Because HFP does not polymerize very rapidly, it is generally by employing large excesses of HFP in a reaction mixture with TFE, $VF_2$, or ethylene that higher HFP content telomers can be produced. As a general guideline, fluoroolefin polymerizations run under conventional conditions (temperatures less than about 100° C., pressures less than about 1000 psi) do not typically produce polymers having greater than about 30 mole % HFP. Thus, polymers having more than about 30 mole % HFP can be considered high in HFP content. TFE, $VF_2$, and ethylene all are known as vigorous polymerizers; that is, if excessive amounts of TFE, $VF_2$, ethylene or combinations thereof are employed in a process, there is the possibility of a run-away polymerization followed by decomposition with potential for explosion. For these reasons, the total quantity of TFE, $VF_2$, and ethylene in any reaction mixture must be maintained below 10 weight %, and the ethylene content may not exceed 3 weight-%. Other of the olefinically unsaturated monomers suitable for use herein do not react so vigorously so the total co-monomer content reacted with HFP can by up to ca. 20 weight-%.

Certain combinations of monomers when used in a process of the present invention can affect the molecular weight of the telomers, as indicated by a higher or lower fraction of the product as a distillable fraction. HFP/$VF_2$/PPVE/ethane and HFP/$VF_2$/PFBE/ethane telomers prepared with NF3 initiator tend to produce product with a relatively high percentage (typically great than about 50%) of distillable fraction. On the other hand, a higher percentage of oil is produced when HFP/$VF_2$/diethyl ether polymerization is initiated with NF3 or di-t-butylperoxide, as illustrated in Example 8 hereinbelow. The proportion of distillable solvent relative to nonvolatile oil is increased by increasing the temperature of the polymerization, with temperatures above 300° C. being preferred and above 325° C. being most preferred. The proportion of volatiles is also increased by increasing the concentration of chain transfer agent relative to monomer, by using relatively active chain transfer agents such as ethane and by including monomers such as PFBE, PPVE, and ethylene in the mix.

The oils prepared by the processes herein are useful as high performance lubricants and as the oil component of high performance greases after admixture with thickening agents such as micropowders of polytetrafluoroethylene, silica, molybdenum disulfide, and graphite. The oils are useful as plasticizers for fluoroelastomers and other fluoropolymers, while distillable solvents can be used as volatile processing aids in extrusion and molding processes. Additionally, the distillable liquids may be used in numerous solvents and liquid uses, including but not limited to the use of the distillate fractions as degreasers, solvents for surface coatings.

EXAMPLES

Materials

All monomers, chain transfer agents, and initiators used in this work are commercially available chemicals. FOMBLIN® and KRYTOX® are trade names for perfluoropolyether lubricating oils manufactured by Solvay-Solexis and DuPont respectively. TEFLON® AF is DuPont's trademark for copolymers of tetrafluoroethylene with perfluorodimethyldioxole.

Monomers and chain transfer agents used or discussed in the Discussion above and Examples below include:

TABLE 1

| Abbreviation | Chemical Name | Formula | Source |
|---|---|---|---|
| HFP | Hexafluoropropylene | $CF_3CF=CF_2$ | DuPont |
| TFE | Tetrafluoroethylene | $CF_2=CF_2$ | DuPont |
| VF2 | Vinylidene Fluoride | $CF_2=CH_2$ | Aldrich |
| PPVE | Perfluoropropyl Vinyl Ether | $CF_2=CFOCF_2CF_2CF_3$ | DuPont |
| PFBE | Perfluorobutylethylene | $CH_2=CHCF_2CF_2CF_2CF_3$ | DuPont |
| TFP | 3,3,3-Trifluoropropylene | $CH_2=CHCF_3$ | Great Lakes |
| E | Ethylene | $CH_2=CH_2$ | Matheson |
| Ethane | Ethane | $CH_3CH_3$ | Matheson |
| HFB | Hexafluorobenzene | $C_6F_6$ | DuPont |
| C8H10 | p-xylene | $CH_3-C_6H_4-CH_3$ | Aldrich |
| C4H10O | Diethyl ether | $CH_3CH_2OCH_2CH_3$ | Aldrich |
| PFBI | Perfluorobutyliodide | $CF_3CF_2CF_2CF_2I$ | DuPont |
| C8H24Si2O2 | Octamethyltrisiloxane | $(CH_3)_3SiOSi(CH_3)_2OSi(CH_3)_3$ | Aldrich |
| HFIB | Hexafluoroisobutylene | $(CF_3)_2C=CH_2$ | DuPont |
| PMVE | Perfluoromethylvinyl ether | $CF_3OCF=CF_2$ | DuPont |

Test Methods

Viscosity

Kinematic viscosities were determined by the American Society for testing and Materials (ASTM) Test Method D 445-97, "Standard Test method for Kinematic Viscosity of Transparent and Opaque Liquids (the calculation of Dynamic Viscosity).

Molecular Weight

Size exclusion chromatography was performed using an Alliance ALLIANCE® 2690 Size Exclusion Chromatograph fitted with a model 410 refractive index detector (DRI) (Waters Corporation, Milford, Mass.). Data was analyzed using EMPOWER™ Pro software (Waters Corporation). Two PLqel Mixed C and one PLgel 500 A° columns from Polymer Laboratories (Amherst, Mass.) were used for separation. Unstabilized THF was used as the mobile phase. The chromatographic conditions were 40° C., flow rate: 1.00 mL/min., injection volume: 100 microL, run time: 35 min.

The samples were prepared at room temperature with moderate agitation by dissolution for 4 h in the THF. The columns were calibrated using a set of 10 narrow polydispersity (<1.1)

polystyrene (PS) standards with peak molecular weights from 580 through 7,500,000 from Polymer Laboratories.

Telomerization Apparatus

A schematic drawing of the telomerization apparatus employed herein is shown in FIG. 1.

The HFP and other monomers were combined with ethane chain transfer agent and initiator in a 1 gallon autoclave, 1, where they formed a liquid phase, 1b, and a gas phase, 1a, under autogenous pressure. Using a high pressure pump, 2, the reactants were cycled from the autoclave, 1, through pressurized tubing, 3, through a 15,500 psi backpressure regulator, 4, and back to the autoclave. A bleeder line, 5, flow-controlled by a needle valve, 6, was adjusted to allow the flow of reactants at ca. 10 cc/sec through a heated stainless steel tubular reactor, 7, with a 0.406 inner diameter heated to ca. 225° C.-400° C. depending upon the specific conditions of reaction, and through a second backpressure regulator, 8, set at 14,000 psi. The pressure was let down as the product flowed into a collector, 9, forming a liquid phase of product and a gas phase of unreacted monomer. The unreacted monomer was passed via a vent line, 10, through a gas flow meter, 11, and vented, 12. Not shown is a NaOH scrubber which was disposed in the vent line upstream from the flow meter for removing acidic reactant residues.

Example 1

The autoclave, 1, was evacuated. Still under vacuum, 50.4 g of liquid perfluorobutylethylene was introduced into the autoclave. 10 grams of gaseous ethane were introduced into the autoclave from a weighed cylinder. 90 g of vinylidene fluoride were introduced into the autoclave from a weighed $VF_2$ cylinder. The lines leading to the autoclave were then pressurized to 415 psig with $NF_3$ and then sealed off, trapping about 2 g of $NF_3$ (25 ml of $NF_3$ at 415 psig). Excess $NF_3$ was vented from the remaining lines. 2000 g of HFP was introduced into the autoclave from a weighed HFP cylinder thereby sweeping the ~2 g of $NF_3$ trapped in the lines into the autoclave.

The contents of the autoclave were mechanically stirred. Throughout the run, liquid phase reactant mixture was continuously pumped, 2, off the bottom of the autoclave passed through the 15,500±100 psi backpressure regulator, 4, and returned to the autoclave 1. Micrometering value, 6, was cracked open, to allow a flow rate of 10 cc/min as indicated on the flow meter, 11. The Foxboro Model IFOA flow meter, 11, had previously been calibrated using pure HFP. The reaction mixture was thereby introduced in the reactor, 7. After a residence time of about 1 minute, the reaction stream was fed through back pressure regulator, 8, set at 14,000±100 psi. The line immediately upstream of the reactor, 7, was electrically heated to 200° C. The reaction stream was then let back down to atmospheric pressure as it exited back pressure regulator, 8. The unreacted gases that flashed off from product collector 9 were scrubbed by bubbling through 5% aqueous NaOH through the scrubber (not shown) in the line, 10, between collector 9 and flowmeter 11 on their way to being vented, 12.

Less volatile product remained behind in the collector 9.

The reaction was run until the liquid phase in the autoclave 1, was largely depleted as indicated by a decrease in pressure to less than 15,500 psi in the monomer recycle loop. The reaction was terminated after 148 minutes, during which the flow meter 11, indicated a flow of 955 grams of unreacted monomer. 758 g of dark brown fluid was recovered from collector 9. The 955 g of unreacted monomer off gases plus the 758 g of fluid recovered from the collector accounted for 1713 g of starting materials, corresponding to an average flow rate through the reactor of ~11.6 g/min with an average residence time in the reactor of 1 minute (based on an assumption that the reactants had a density of ~1 g/cc at 14,000 psi and 375° C.). Conversion of reactor feed to crude product was 34%. Productivity was 260 lbs/gallon/hr calculated on the basis of 758 g of crude product.

C. Product Work UP and Characterization.

The 758 g of crude product was transferred to a glass flask and distilled into two fractions. A first fraction was collected after distillation up to 100° C. at atmospheric pressure. The second fraction was also collected up to 100° C. but under a pressure of 1 torr. The properties of the two distillate fractions and the pot residue are given in Table 2. Running the oligomerization for 148 minutes to make 270 g of oil corresponds to productivity for oil production of 91 lbs/gallon/hr. Carbon hydrogen analysis of the two distillate fractions and the oil were consistent with a composition of 93% HFP/3% $VF_2$/2% PFBE/1% ethane for Distillate Fraction #1; 75% HFP/31% $VF_2$/4% PFBE/3% ethane for Distillate Fraction #2, and 32% HFP/48% $VF_2$/17% PFBE/3% ethane for the Residual Oil.

TABLE 2

| Property Measured | Distillate Fraction #1 | Distillate Fraction #2 | Residual Oil |
|---|---|---|---|
| Weight | 89 g | 272 g | 270 g |
| Color | Colorless | Light Yellow | Brown |
| Molecular Weight by GPC vs. Polystyrene | Mw 140 Mn 120 | Mw 290 Mn 240 | Mw 1560 Mn 590 |
| Carbon/Hydrogen Analysis | 24.23% C 0.27% H | 26.71% C 0.45% H | 29.72% C 1.11% H |
| Viscosity @ 40° C. | — | — | 117.0 cSt |
| Viscosity @ 100° C. | — | — | 15.1 cSt |
| Solubility of 58.2/41.8 wt % Poly(HFP/TFE), $n_{inh}$ = 0.47 | Clear viscous solution | Swells but does not dissolve | — |
| Solubility of TEFLON AF 1601 | Partial viscous solution | Clear viscous solution | — |

Example 1A

A series of #51200 stainless steel ball bearings were immersed in the oil prepared in Example 1, Krytox® oil, and Fomblin® oil, heated for 24 hours at different temperatures, and then visually inspected for corrosion. Corrosion was evaluated subjectively on a 1-5 scale, where 1 corresponded to a shiny ball-bearing surface with no evidence of corrosion, 2 corresponded to some discoloration and pitting; 3 corresponded to pitting on about half of surface; 4 corresponded to pitting on most of the surface; and, 5 corresponded to hazy oil and the ball completely pitted. Results are shown in Table 3.

TABLE 3

CORROSION RATINGS

| Oil Tested | Heating Temperature | | | | |
|---|---|---|---|---|---|
| | 200° C. | 220° C. | 240° C. | 260° C. | 280° C. |
| FOMBLIN ® YL | 2 | 3 | 4 | 5 | — |
| KRYTOX ® 1514 | 2 | 3 | 4 | 5 | — |
| Oil from Example 1A | 2 | 2 | 3 | 3 | 4 |

Example 1B

A glass vial was loaded with 0.5 g of low boiling distillate Fraction #1 from Example 1 and 0.05 g of a 58.2/42.8 wt % HFP/TFE copolymer (inherent viscosity 0.470 in FLUORI-NERT® FC-75). Rolling the vial at room temperature for several days gave a clear viscous solution. Evaporating a pool of this solution on a glass microscope slide at room temperature left the poly(HFP/TFE) as a film on the glass slide.

Example 1C

A glass vial was loaded with 0.5 g of vacuum distillate Fraction #2 from Example 1 and 0.05 g of TEFLON AF 1601. Rolling the vial at room temperature for about a week dissolved most of the polymer, giving a clear viscous solution.

Examples 2 to 23 and Comparative Examples A-D

Oligomerizations were run using the equipment and methods of Example 1. 2000 g of HFP were employed in all Examples and Comparative Examples.

Any deviations from the conditions of Example 1 are noted in Table 4. In a number of examples a 5 cc tubular reactor was used rather than the 10 cc reactor of Example 1. This had the effect of pushing residence times in the tubular reactor towards 10 to 15 seconds. Even at 10-15 second residence times productivities for total product still approached 500 lbs/gallon/hr (60 kg/liter/hour). Pressures in the tubular reactor were occasionally decreased from 14,000 psi to 8,000 (Example 8) or 10,000 psi (Examples 6, 9, 18), again without drastic decreases in productivity. In Example 5, the starting reaction mixture was diluted down with carbon dioxide. In many examples, the vacuum distillation was taken to 150-200° C. in the process of isolating the oil fraction. In Example 10 di-t-butylperoxide was injected immediately ahead of the tubular reactor starting at a rate of ~0.04 ml/minute and increasing in steps over the course of the run to 0.33 ml/minute. In Example 23, 60 ml of di-t-butylperoxide was mixed with 30 ml of CF3CFHCFHCF2CF3. This mixture was injected into the line immediately ahead of the 5 cc tubular reactor at a rate of ~0.17 ml/minute.

The quantities of initiator and monomer reactants were either weighed in or calculated on the basis of the temperature, pressure, and volume of the addition segment and autoclave respectively. These locations are discharged to the reactor, but the transfer is not quantitative. Thus amounts of nitrogen trifluoride and monomer reactants as described in the Examples are approximate.

In Examples 10 and 23, DTBP indicated under the $NF_3$ column indicates that di-t-butyl peroxide was employed in place of $NF_3$.

In Table 4, the weight of $NF_3$ initiator introduced into the autoclave, 2, shown in FIG. 1, is calculated using the ideal gas law, $PV=nRT$ where P is the $NF_3$ pressure in the make-up section, 1, shown in FIG. 1, and V is the volume of the make-up segment.

Raw yield was the weight of all fluid product or solid polymer in grams removed from the collector, 7, shown in FIG. 1. The reactor productivity shown in the last column in lb/gal/hr refers to the oil fraction only.

TABLE 4

| Example # | Reactor (cc)/ Pressure (kpsi) | TFE (g) | $VF_2$ (g) | Other Monomers | Chain Transfer Agent | $NF_3$ (g) | ° C. | Yield (g) | Product & Comments |
|---|---|---|---|---|---|---|---|---|---|
| 1 | 10/14 | | 90 | 50 g C4F9CH=CH2 | 10 g Ethane | 2 | 375 | 758 | Brown Oil, 117 cSt @40° C. 91 lb/gal/hr |
| 2 | 5/14 | | 90 | 97.5 g C4F9CH=CH2 | 10 g Ethane | 2 | 375 | 596 | Yellow Oil, 180.5 cSt @ 40° C. 72 lb/gal/hr |
| 3 | 5/14 | | 90 | 200 g C4F9CH=CH2 | 20 g Diethyl Ether | 16 | 275 | 252 | Yellow Oil, 67.6 cSt @ 40° C. 94 lb/gal/hr |
| 4 | 5/14 | | 90 | 200 g C4F9CH=CH2 | 50 ml C4F9I | 8 | 275 | 165 | Purple Oil, 84 cSt @ 40° C. 73 lb/gal/hr |
| 5 | 5/14 | | 90 | 99 g C4F9CH=CH2 | 10 g Ethane | 2 | 350 | 426 | Yellow Oil, 178 cSt @ 40° C. 104 lb/gal/hr |
| 6 | 10/10 | | 90 | | 20 g Ethane | 2 | 375 | 732 | Brown Oil, 767 cSt @ 40° C. 132 lb/gal/hr |
| 7 | 5/14 | | 90 | | 39 g Octamethyltrisiloxane | 16 | 275 | 392 | Brown Oil, 1285 cSt @ 40° C. 195 lb/gal/hr |
| 8 | 5/8 | | 200 | | 41 g Ether | 8 | 275 | 220 | Yellow Oil, 278.5 cSt @ 40° C. 89 lb/gallon/hr |
| 9 | 10/10 | | 90 | 11 g Ethylene | 10 g Ethane | 2 | 375 | 151 | Black Oil, 1117 cSt @ 40° C. 73 lb/gal/hr |
| 10 | 10/14 | | 90 | | 20 g Ethane | DTBP* | 275 | 336 | Yellow Oil, 1032 cSt @ 40° C. 157 lb/gal/hr |
| 11 | 10/14 | | 90 | 100 g PPVE | 20 g Ethane | 2 | 375 | 875 | Brown Oil, 57.8 cSt @40° C. 92 lb/gal/hr |
| Comp. Ex. D | 10/14 | | 90 | 102 g PPVE | | 2 | 375 | 510 | Hazy Orange Oil, 11,600 cSt @ 40° C. 78 lb/gal/hr |

TABLE 4-continued

| Example # | Reactor (cc)/ Pressure (kpsi) | TFE (g) | VF$_2$ (g) | Other Monomers | Chain Transfer Agent | NF$_3$ (g) | °C. | Yield (g) | Product & Comments |
|---|---|---|---|---|---|---|---|---|---|
| 12 | 5/14 | | 90 | 80 g CF3CH=CH2 | 20 g diethyl ether | 8 | 275 | 337 | Red Oil, 80.2 cSt @ 40° C., 198 lb/gal/hr |
| 13 | 5/14 | | 90 | 160 g CF3CH=CH2 | 20 g Diethyl Ether | 8 | 275 | 181 | Yellow Oil, 279 cSt @40° C. 58 lb/gal/hr |
| 14 | 5/14 | | 90 | 160 g CF3CH=CH2 | 20 g Diethyl Ether | 16 | 250 | 94 | Brown Oil, 539 cSt @ 40° C. 34 lb/gal/hr |
| 15 | 5/14 | | 90 | 157 g CF3CH=CH2 | 100 ml C6F6 | 8 | 275 | 205 | Yellow Oil, 1839 cSt @ 40° C. 66 lb/gal/hr |
| 16 | 5/14 | | 90 | 136.4 g CF3CH=CH2 | 50 ml p-xylene | 8 | 275 | 90 | Yellow Oil, 9.1 cSt @40° C., 38 lb/gal/hr |
| 17 | 5/14 | | 90 | 41.5 g CF3CH=CH2 | 10 g Ethane | 2 | 300 | 383 | Yellow Oil 845 cSt @ 40° C. 169 lb/gal/hr |
| Comp. Ex. A | 10/14 | 80 | | | | 1 | 275 | 91 | Dry Polymer 22 lb/gal/hr |
| Comp. Ex. B | 10/14 | 80 | | | | 1 | 275 | 66 | Dry Polymer |
| 18 | 10/10 | | 90 | 10 g Ethylene, 102 g PPVE | 10 g Ethane | 2 | 375 | 574 | Brown Oil, 183 cSt @40° C. 55 lb/gal/hr |
| Comp Ex. C | 10/14 | 80 | | 98 g PPVE | | 2 | 375 | 168 | Yellow Oil, 6755 cSt @40° C. 17 lb/gal/hr |
| 19 | 10/14 | 80 | | 97 g PPVE | 20 g Ethane | 2 | 350 | 418 | Yellow Oil, 319 cSt @40° C. 31 lb/gal/hr |
| 20 | 10/14 | 80 | | 99 g PPVE | 10 g Ethane | 2 | 375 | 340 | Brown Oil, 128 cSt @40° C. 43 lb/gal/hr |
| 21 | 10/14 | | | 50 g Ethylene | 20 g Ethane | 2 | 325 | 251 | Brown Oil, 2447 cSt @ 40° C. 33 lb/gal/hr |
| 22 | 5/14 | | 90 | 203 g C4F9CH=CH2 | 16 g Ethane | 8 | 275 | 221 | Yellow Oil, 2690 cSt @ 40° C. 86 lb/gal/hr |
| 23 | 5/14 | 20 | 70 | | 20 g Ethane | DTBP | 275 | 254 | Light Brown Oil, 494 cSt @ 40° C. 127 lb/gal/hr |

What we claim is:

1. A process comprising:
1) forming a reaction mixture by combining reactants comprising from 80 to 99 weight % of hexafluoropropylene, from 1 to 20 weight % of an olefinically unsaturated co-monomer, from 0.05 to 2 weight % of a free-radical initiator, and from 0.25 to 5 weight-% of a non-monomeric chain transfer agent, based on the total weight of the reaction mixture;
2) causing the free-radical initiator to initiate a free-radical polymerization; and
3) causing the reaction mixture to undergo free radical polymerization at a temperature in the range of 225 to 400° C. and a pressure of 40-700 MPa, for a period of 10 seconds to 1 minute, to form an amorphous hexafluoropropylene liquid telomer comprising from 30 mole % to 95 mole % of monomer units derived from hexafluoropropylene, said liquid telomer being characterized by a viscosity in the range of 1 to 10,000 centistokes at 40° C.; whereby the amorphous hexafluoropropylene liquid telomer is formed at a rate of 31-198 pounds per gallon per hour;
wherein the olefinically unsaturated co-monomer is selected from the group consisting of tetrafluoroethylene, vinylidene fluoride; ethylene, perfluoroalkylvinyl ether of the structure R$_f$OCF=CF$_2$ wherein R$_f$ is a C$_1$-C$_4$ perfluoroalkyl radical; hexafluoroisobutylene; perfluoroalkylethylenes of the structure R'fCH=CH$_2$ wherein R'$_f$ is a linear C$_1$ to C$_8$ perfluoroalkyl radical; vinyl fluoride (VF); trifluoroethylene; tetrafluoroethylene; and chlorotrifluoroethylene, and the concentration of ethylene is 3 weight % or less, provided that when the olefinically unsaturated co monomer is vinylidene fluoride, perfluoropropylvinyl ether, ethylene, or tetrafluoroethylene, the total of the concentrations of vinylidene fluoride, ethylene, and tetrafluoroethylene is 10 weight % or less.

2. The process of claim 1 wherein the olefinically unsaturated comonomer is selected from the group consisting of vinylidene fluoride, perfluoropropylvinyl ether, perfluoromethylvinyl ether, perfluoroisopropylvinyl ether, ethylene, hexafluoroisobutylene, perfluorobutylethylene, 3,3,3-trifluoropropene, vinyl fluoride, trifluoroethylene, and tetrafluoroethylene.

3. The process of claim 2 wherein the olefinically unsaturated co monomer is vinylidene fluoride, perfluoropropylvinyl ether, ethylene, or tetrafluoroethylene.

4. The process of claim 3 wherein the olefinically unsaturated co-monomer is tetrafluoroethylene at a concentration of 1 to 10 weight %.

5. The process of claim 3 wherein the reaction mixture further comprises one or more additional monomers selected from the group consisting of: vinylidene fluoride; a perfluoroalkylvinyl ether of the structure R$_f$OCF=CF$_2$ wherein R$_f$ is a C$_1$-C$_4$ perfluoroalkyl radical; hexafluoroisobutylene; perfluoroalkylethylenes of the structure R'$_f$CH=CH$_2$ wherein R'$_f$ is a linear C$_1$ to C$_8$ perfluoroalkyl radical; vinyl fluoride (VF); trifluoroethylene; tetrafluoroethylene; and combinations thereof.

6. The process of claim 5 wherein the one or more additional monomers are selected from the group consisting of ethylene; tetrafluoroethylene; a combination of hexafluoroisolbutylene and ethylene; hexafluoroisobutylene; a combination of perfluorobutylethylene and ethylene; a combination of perfluoromethyl vinyl ether and ethylene; a combination of perfluoropropyl vinyl ether and ethylene; and perfluoropropyl vinyl ether; wherein the total of the concentrations of vinylidene fluoride, ethylene, and tetrafluoroethylene is 10 weight %- or less.

7. The process of claim 1 wherein the free radical initiator is nitrogen trifluoride or di-t-butylperoxide.

8. The process of claim 1 wherein the chain transfer agent is selected from the group consisting of linear, branched, or cyclic $C_1$-$C_6$ hydrocarbons, dialkyl ethers, tetrahydrofuran, $FSO_2Cl$, $ClSO_2Cl$, aromatics, and siloxanes.

9. The process of claim 8 wherein the chain transfer agent is selected from the group consisting of ethane, dimethyl ether, diethyl ether, tetrahydrofuran, $FSO_2Cl$, $ClSO_2Cl$, p-xylene, hexafluorobenzene, and octamethyltrissiloxane.

10. The process of claim 9 wherein the chain transfer agent is ethane.

\* \* \* \* \*